United States Patent [19]

Steen et al.

[11] 4,294,431

[45] Oct. 13, 1981

[54] METHOD OF PROVIDING AND MAINTAINING A WEAR-LINING OF A STEEL CONVERTER AND A STEEL CONVERTER HAVING SUCH A LINING

[75] Inventors: Adam Steen, Heemskerk; Hendrik M. Verhoog, Heemstede, both of Netherlands

[73] Assignee: Hoogovens Ijmuiden B.V., Ijmuiden, Netherlands

[21] Appl. No.: 55,388

[22] Filed: Jul. 6, 1979

[30] Foreign Application Priority Data

Jul. 14, 1978 [NL] Netherlands ................ 7807580

[51] Int. Cl.³ .................... C21B 13/00; C21B 15/00
[52] U.S. Cl. ........................... 266/44; 75/60
[58] Field of Search ............ 266/44, 281; 75/52, 75/60

[56] References Cited

U.S. PATENT DOCUMENTS 2,801,099 7/1957 Larson ............................ 266/44
3,994,676 11/1976 Strimple .......................... 266/281

OTHER PUBLICATIONS

Yamagushi and Hasegawa, "Heat Gunning Materials for Converter", Taikabutsu Refractories, 1973, 25, No. 180, pp. 19-21.
Ghose et al., "Refractories for Basic Oxygen Steel", Iron & Steel Review, 1975, 19, No. 6, pp. 17-24.

*Primary Examiner*—P. D. Rosenberg
*Attorney, Agent, or Firm*—Stevens, Davis, Miller & Mosher

[57] ABSTRACT

The basic wear-lining of a steel converter is made of refractory material at least partly composed of burnt magnesite. Maintenance is performed by spraying refractory material onto this lining or by "slagging-in". The effect of this maintenance procedure, in terms of the duration of the lining, are improved if the particles of the magnesite component of the wear-lining contain on average more than $6\frac{1}{4}$ percent monticellite. Material of this kind has not in the past been found suitable for a wear-lining.

9 Claims, 1 Drawing Figure

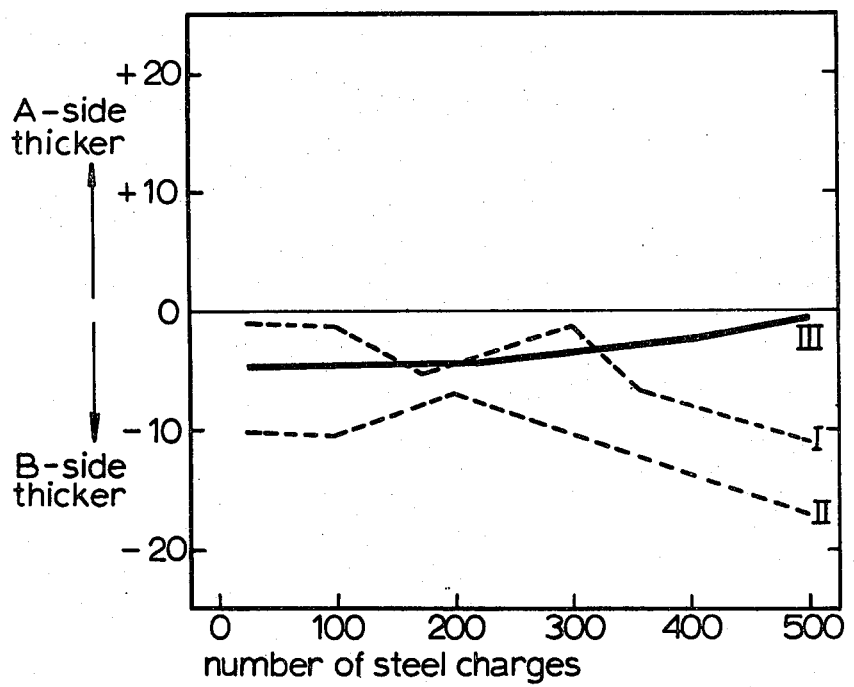

METHOD OF PROVIDING AND MAINTAINING A WEAR-LINING OF A STEEL CONVERTER AND A STEEL CONVERTER HAVING SUCH A LINING

BACKGROUND OF THE INVENTION

1. Field of the Invention

The invention relates to a method of operating a steel converter which has a basic wear-lining formed of refractory material at least partly composed of burnt magnesite including the step of performing maintenance on the said lining by intermittently spraying refractory material onto the wear-lining and/or slagging-in while the wear-lining is hot.

The invention also relates to a method of providing and maintaining such a wear-lining and to a steel converter which is provided with such a wear lining.

2. Description of the Prior Art

In this specification and claims, we use the term "steel converter" to refer not only to ladles used in steel-manufacture by the so-called LD-process but also to the vessels used in all other processes in which a mass of molten metal is refined to steel by blowing in or blowing on oxygen. Such vessels are usually provided with a so-called safety or permanent lining which is formed as brickwork on the steel wall of the vessel, and with a wear-lining which is contacted by the molten metal. It is common to reduce the rate of wear of the wear-lining, and thus increase the useful life of the lining, by performing a maintenance step on the wear-lining regularly after a certain number of charges of the converter. This step is either spraying a refractory mass onto the wear-lining or to coat the wear-lining with slag, in both cases while the lining is hot. The latter practice, so-called slagging-in, typically consists in that any residual slag left in the converter after steel tapping is distributed over the surface of the wear-lining by tipping the ladle. However, methods of distributing residual slag over the wall surface by spraying this slag are also known. None of these methods need any further explanation since they are sufficiently widely known in this technical field.

Although in the past, and even at present in Western Europe in particular, use is frequently made of bricks of burnt dolomite in the wear-lining, there is a marked trend to change over to bricks manufactured of burnt magnesite. It is generally accepted that the use of the latter material may result in prolongation of the useful life of the lining. Bricks of magnesite are obtained by pressing a starting material of burnt magnesite grains, mixed with coal tar products as a binding material, into bricks. Bricks are also sometimes made of magnesite grains which are burnt at high temperatures so that ceramic cohesion between the grains is achieved, whereafter the bricks are impregnated with coal tar products.

The burnt magnesite particles or grains used for the manufacture of such bricks consist chiefly of magnesium oxide, while other oxide components such as CaO, $SiO_2$, $Fe_2O_3$, $Al_2O_3$, etc. may also be present to a greater or lesser degree. In mineralogical terms, the magnesite is composed of so-called periclase particles, the size of which typically varies between 0.01 and 0.1 mm. The other oxides mentioned above have various mineralogical combination types, which are principally of the periclase type. On account of their chemical affinity, the oxides CaO and $SiO_2$ preferentially form compounds with each other, whether or not in combination with MgO.

G. R. Rigby, H. M. Richardson and F. Ball in "Bulletin of the British Refractories Research Association" No. 71 of June 1946, describe a method by which the mineralogical composition of sintered magnesite can be calculated on the basis of its chemical composition. This method, which has been confirmed by experiments, proposes that the ratio of the CaO and $SiO_2$ oxides present is determinative of the type(s) of silicate produced. In a molar $CaO\text{-}SiO_2$ ratio of 2 or more, these oxides form di-calciumsilicate or tri-calciumsilicate. If this molar ratio is between 1.5 and 2, the compounds di-calciumsilicate and merwinite ($3CaO.MgO.2SiO_2$) are produced; if between 1 and 1.5, the compounds merwinite and monticellite ($CaO\text{-}MgO.SiO_2$) are produced; if the molar ratio is less than 1, monticellite and forsterite ($2MgO.SiO_2$) will be produced.

Generally in this technical field it is assumed that the longest life of the wear-lining can be achieved by using magnesite material of the highest possible grade. In this respect a high-grade magnesite material is assumed to be characterised by a maximum percentage of MgO and by a suitably chosen molecular ratio of CaO and $SiO_2$.

The ratio of CaO to $SiO_2$ in the magnesite is important particularly in those magnesite grades which contain large quantities of oxide other than MgO. This is the reason that, in the use of magnesite as a lining material for steel furnaces and in particular converters, in general the quality of the magnesite grade is assumed to be higher as the MgO content increases, and the requirement has been set that the molecular ratio $CaO:SiO_2$ is greater than 2.

When the amount of dirt present is low, the periclase particles will be in direct contact and form a directly bonded structure, but if a high percentage of dirt is present, contact between the perclase particles is via an intermediate phase. If this intermediate phase is low-melting, the obvious assumption is that under operating conditions the wear resistance of the material will be harmed.

Recent developments have shown that the ultimate lifetime of the lining brickwork depends more and more on the extent to which attempts to apply maintenance material onto the wear-lining are successful.

SUMMARY OF THE INVENTION

The present invention is thus concerned with the problem of providing a wear-lining of a steel converter which is highly resistant to wear during operation of the converter. The object of the invention is to provide a lining which, provided it is suitably maintained, wears less rapidly than conventional wear-linings.

The invention as described in the claims is intended to achieve this result. Briefly, the invention proposes that the particles in the magnesite component of the wear-lining contain on average more than 6% monticellite. When this feature is combined with one or both of the (already known) techniques of maintenance, i.e. spraying refractory material onto the lining and slagging-in as described above, a remarkably long-lasting wear-lining is obtained. It is important to realize that the invention thus represents a combination of correct choice of material for the initially applied wear-lining and the performance of adequate maintenance.

This proportion of monticellite required according to the invention is calculated by the method of Rigby, Richardson & Ball, as identified above. Although monticellite has a comparatively low melting point, it has been found that this has little effect on the wear resistance of the brick. On the other hand it has appeared that in the intermediate phase of the magnesite particles monticellite provides a marked improvement in cohesion of the material applied during maintenance. This beneficial effect of the presence of monticellite is particularly evident if the grains contain between 2.7% and 6% $SiO_2$. It must be pointed out that the invention represents a complete break with the general view of those skilled in this art, as described above. Hitherto technical opinion has been that the wearability of a wear-lining is chiefly determined by the pre-supposed "quality" of the material of the wear-lining itself. In this context the invention is radically different because it makes possible the use of certain cheaper basic sintering materials which are generally thought to be of poor quality. However, a lining of long life can be achieved by making use of the unexpected property that linings manufactured from such materials do in fact have excellent properties if properly maintained by applying a layer of basic material applied by spraying or slagging-in.

Although satisfactory results have been achieved with a wear-lining composed of refractory particles consisting only of MgO, it has appeared that very good results are also obtained if the refractory particles of the wear-lining consist of a mixture of about equal parts of MgO and burnt dolomite.

An example of the invention will now be described with reference to the accompanying drawing showing a graph in which the abscissa indicates the measured difference in thickness of a converter at two locations on the converter, A and B, and the ordinate indicates the number of steel charges made during the experiment.

EXAMPLE

Determination of the useful life of the wear-lining of a 300 ton LD converter was carried out by performing production programmes of conventional types of unalloyed carbon steel. Three wear-linings were tested in programmes designated I, II and III respectively. In programmes I and II the wear-linings consisted entirely of a sintered magnesite material of a conventional composition, containing about 1% monticellite and about 2% $SiO_2$. In programme III, the converter had two different linings at different places. At the location of one of the converter trunnions (the "A"-side) over a quarter of the ladle circumference and the full cylindrical height of the ladle, a panel of the wear-lining was made of a sintered magnesite containing 6.3% monticellite and 3.2% $SiO_2$. While the programmes were being carried out, the thickness of the wear-lining was determined regularly both on the A-side and on the opposite "B"-side of the ladle. The results of these measurements are plotted on the graph, the horizontal axis of which is the numbers of charges since the beginning of the programme.

The measurements of thickness are expressed as differences in thickness of the wear-lining between the A and B sides of the converter. In each measurement the thinnest spots on the A side and the B side respectively were taken as the measurement value.

As maintenance, the wear-lining was sprayed at fixed intervals with a Fe-rich, waterglass-containing, magnesitic spraying mass of a widely used type, which is offered for sale under the type-designation OW70 by Messrs. Veitsch. The following table gives the amounts of this spraying mass applied to the A and B sides of the converter in the three programmes, as well as the differences in these quantities for each programme.

| PROGRAMME | A-SIDE | B-SIDE | Differences (A–B) |
|---|---|---|---|
| I | 19225 kg | 18950 kg | + 275 kg |
| II | 19750 kg | 19650 kg | + 100 kg |
| III | 18240 kg | 18090 kg | + 150 kg |

These amounts were sprayed on in each case between the two-hundreth charge and the five-hundreth charge. It is clear from these figures that in the three programmes there were only negligible differences in the amounts of material sprayed onto the A and B sides, and these differences can have had hardly any impact, if any at all, on the measured results of the thickness of the wear-lining.

It is apparent from the graph that in the programmes I and II with wear-linings of the same material all round, there is a typical tendency for this converter to wear faster at the A-side. The cause of this systematically more severe wear on the A-side is not relevant here. It can be seen from the line denoting programme III that the wear of the trial panel on the A-side is appreciably less than in the case of programmes I and II. This must be attributed to the fact that the material of the trial panel on the A-side adheres far better to the material sprayed on during maintenance than the material of the conventional wear-linings. It should be noted here that without the practice of spraying on material in maintenance, the trial panel wears out far more quickly. Similar tests employing the practice of slagging-in as maintenance verify in broad outline the results given above.

What is claimed is:

1. In a method of operating a steel converter which has a basic wear-lining formed of refractory material at least partly composed of burnt magnesite, including the step of performing maintenance on the said lining by intermittently spraying refractory material onto the wear-lining and/or slagging-in while the wear-lining is hot, the improvement that the particles of the magnesite component of the wear-lining contain on average more than 6% monticellite.

2. Method according to claim 1 wherein said particles of the magnesite component of the wear-lining contain not less than 2.7% and not more than 6% of $SiO_2$.

3. Method according to one of claims 1 and 2 wherein the wear-lining is at least 50% MgO.

4. Method according to one of claims 1 and 2 wherein the material of wear-lining is a mixture of about equal amounts of burnt magnesite and burnt dolomite.

5. Method of providing and maintaining a wear-lining of a steel converter, comprising the steps of (a) initially providing a basic wear-lining of refractory material which is at least partly composed of burnt magnesite which consists of particles containing on average more than 6% monticellite and (b), during the operation of the steel converter, intermittently spraying refractory material onto the hot wear-lining and/or slagging-in.

6. A steel converter having a basic wear-lining formed of refractory material at least partly composed of burnt magnesite, wherein, in order to improve the wear-resistance of the lining when maintained during operation of the converter by spraying refractory material onto the hot wear-lining and/or by slagging-in, the particles of the magnesite component of the wear-lining contain on average more than 6% monticellite.

7. A steel converter according to claim 6 wherein said particles of the magnesite component of the wear-lining contain not less than 2.7% and not more than 6% of $SiO_2$.

8. A steel converter according to one of claims 6 and 7 wherein the wear-lining is at least 50% MgO.

9. A steel converter according to one of claims 6 and 7 the material of wear-lining is a mixture of about equal amounts of burnt magnesite and burnt dolomite.

* * * * *